(12) United States Patent
Siddiqui

(10) Patent No.: US 9,071,287 B2
(45) Date of Patent: Jun. 30, 2015

(54) NEAR FIELD COMMUNICATION (NFC) EDUCATIONAL DEVICE AND APPLICATION

(71) Applicant: Qirfiraz Siddiqui, Castro Valley, CA (US)

(72) Inventor: Qirfiraz Siddiqui, Castro Valley, CA (US)

(73) Assignee: Qirfiraz Siddiqui, Castro Valley, CA (US)

(*) Notice: Subject to any disclaimer, the term of this patent is extended or adjusted under 35 U.S.C. 154(b) by 144 days.

(21) Appl. No.: 13/843,240

(22) Filed: Mar. 15, 2013

(65) Prior Publication Data

US 2014/0113552 A1 Apr. 24, 2014

Related U.S. Application Data

(60) Provisional application No. 61/685,382, filed on Mar. 16, 2012, provisional application No. 61/687,090, filed on Apr. 17, 2012.

(51) Int. Cl.
*H04B 5/00* (2006.01)

(52) U.S. Cl.
CPC .................................. *H04B 5/0056* (2013.01)

(58) Field of Classification Search
USPC ........... 455/3.01, 3.03, 3.05, 3.06, 41.1, 41.2, 455/41.3, 414.1, 414.2, 414.3, 556.1, 455/556.2; 340/10.1, 13.24, 13.25, 13.26
See application file for complete search history.

(56) References Cited

U.S. PATENT DOCUMENTS

| | | | | |
|---|---|---|---|---|
| 7,126,481 B2 * | 10/2006 | Vesikivi et al. | ............ | 340/572.4 |
| 7,363,035 B2 * | 4/2008 | Reilly | ................. | 455/432.3 |
| 7,433,649 B2 * | 10/2008 | Toulis et al. | ................. | 455/41.2 |
| 7,756,467 B2 * | 7/2010 | Bent et al. | ..................... | 455/3.04 |
| 8,094,021 B2 * | 1/2012 | Nichols et al. | ............ | 340/568.7 |
| 8,350,675 B2 * | 1/2013 | Riechel | ........................ | 340/10.1 |
| 8,418,918 B2 * | 4/2013 | Saunders et al. | .............. | 235/380 |
| 8,599,023 B2 * | 12/2013 | Leggett et al. | ............. | 340/572.1 |

* cited by examiner

*Primary Examiner* — Tuan A Tran
(74) *Attorney, Agent, or Firm* — Kamran Emdadi

(57) ABSTRACT

Disclosed are an apparatus and method of initiating an educational application user interface. One example method of operation may include receiving a near field communication signal from a passive near field tag at an active near field communication device operating an educational application user interface. The passive tags may be used to provide educational segment triggers which offer educational content pertaining to the particular lesson being conducted.

9 Claims, 12 Drawing Sheets

NEAR FIELD COMMUNICATION (NFC) EDUCATIONAL DEVICE AND APPLICATION

CROSS-REFERENCE TO RELATED APPLICATIONS

This application claims priority to U.S. provisional patent application Nos. 61/685,382 filed on Mar. 16, 2012 and 61/687,090 filed on Apr. 17, 2012 the entire contents of which are hereby incorporated by reference in their entireties.

TECHNICAL FIELD OF THE APPLICATION

This application relates to a method and apparatus of using near field communication (NFC) hardware to enable a student to learn from various different physical learning configurations.

BACKGROUND OF THE APPLICATION

Conventionally, schools and other teaching institutions have relied on books, chalk boards, and a few other simple instruments when conducting a teaching session for its pupils. In 1907, Dr. Maria Montessori, developed a scientific method of teaching to educate children through direct control of their environment. This method used certain materials to stimulate a child's senses and make the learning experience more memorable for learning purposes. This approach used hands-on materials, such as a board or rug to offer a student an opportunity to move objects around with their hands while learning new concepts.

One example included "numerical rods" which included ten rods of varying length which represented 10 numbers from 1 to 10. Each rod is divided by two colors (with the exception of the one portion rod), such as red and blue sections. This permitted the children to intuitively grasp the relationship between length and an associated number.

The original Casa Dei Bambini opened in Rome in 1907. Over the last 100 years there have been significant changes in the construction and exterior look and feel of Montessori equipment. Overall, the functionality of the equipment has remained the same, and there has not yet been any computer-based platforms or other modern technology introduced into the learning process to improve the hundred year old teaching methods. In fact, the Montessori movement has been quite apprehensive to the notion of adopting modern technology in general, including electronic media and related devices. Television is still considered a bad influence over children by older teaching institutions. Some well-respected institutions don't even embrace Internet access, even for the non-teaching office staff members.

SUMMARY OF THE APPLICATION

One embodiment of the present application may include a method of initiating an educational application user interface, receiving a near field communication signal from a passive near field tag at an active near field communication device operating the educational application user interface, identifying an information identifier associated with the passive near field tag, comparing the information identifier to an information identifier stored in memory, matching the information identifier with a predefined educational information content stored in the memory, and displaying the predefined educational information content on the educational application user interface via a display associated with the active near field communication device.

Another example embodiment may include an apparatus that includes a processor configure to initiate an educational application user interface, a near field receiver configured to receive a near field communication signal from a passive near field tag, and wherein the processor is further configured to identify an information identifier associated with the passive near field tag, compare the information identifier to an information identifier stored in memory, match the information identifier with a predefined educational information content stored in the memory, and a display configured to display the predefined educational information content on the educational application user interface.

DETAILED DESCRIPTION OF THE APPLICATION

Figure 1A:
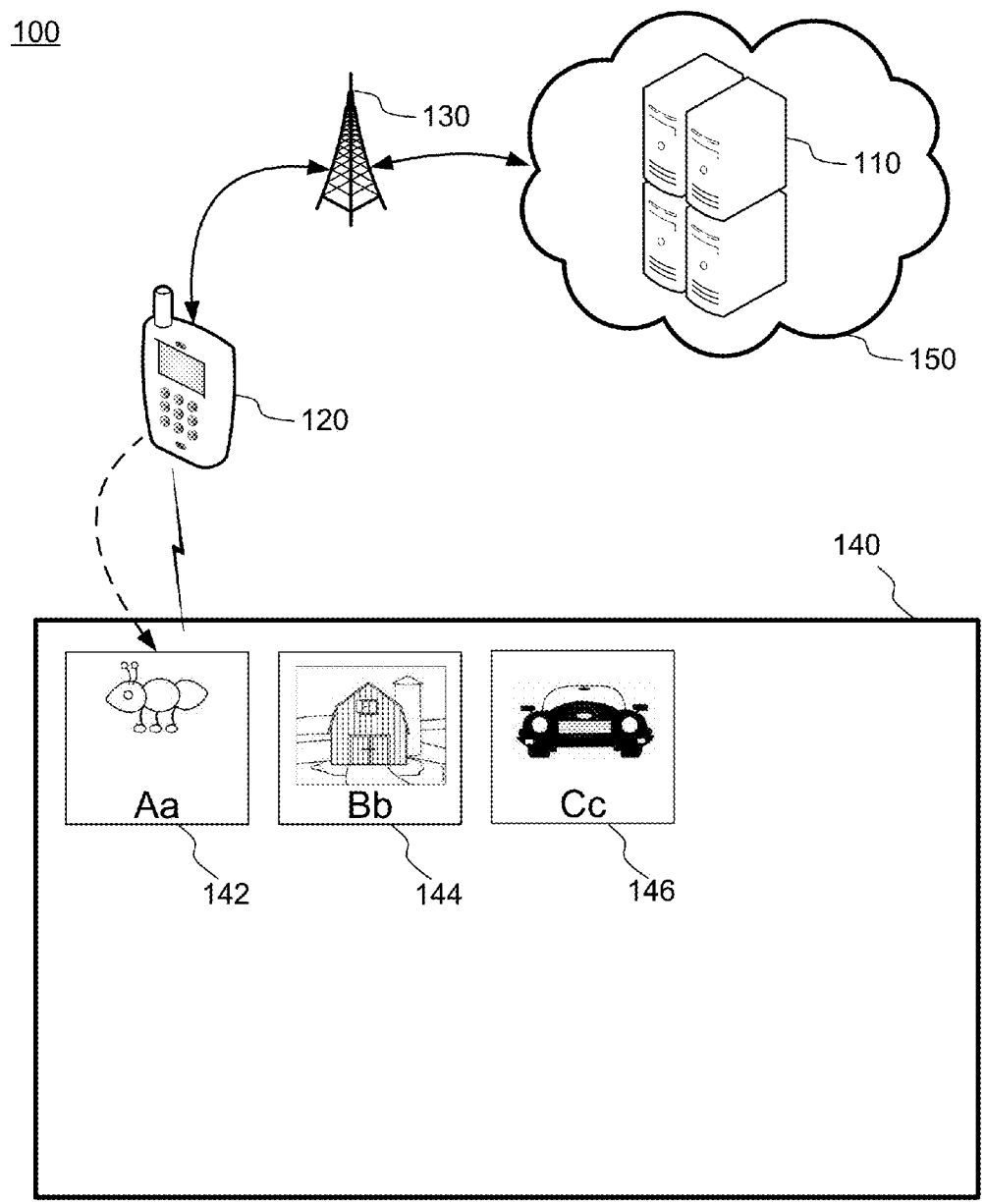
FIG. 1A illustrates an example near field communication system configuration according to example embodiments of the present application.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

In general, near field communication (NFC) technology is non-intrusive in nature and can be easily integrated into any NFC chip having or reading device, while the existing look and feel of the corresponding equipment can be preserved. For example, passive NFC tags can be easily hidden inside a device, such as a "numerical rod", and the teacher or students may not even know the difference, until a "reader unit" is placed between two rods, and the result of the operation is pronounced in an audio-visual form.

In other examples, NFC technology may require low power electronic circuits, which makes it ideal for use in child toys as it has an almost negligible specific absorption rate (SAR) rating. In general, NFC tags are inexpensive and so are the microcontrollers used to interact with such devices. The microcontroller may be required to perform logical functions of the educational tool and provide feedback via a visual display or via a computer device in communication with the NFC reader, tags, etc. This configuration permits the NFC teaching components to be designed in mass-production to include smart, self-aware, educational toys and gadgets. For example, a typical numerical rod set is sold for +/−$30-$40, so the additional cost of embedding NFC tags will be less than a couple of dollars, and it can easily absorbed by adjusting the existing price range of a retail learning instrument.

Also, reader units can be manufactured in a variety of price ranges depending upon the required quality of the user experience. The cheapest reader units may be stand-alone and can have a seven-segment monochrome LCD or LED double digit display. More expensive units can have high resolution audio-visual outputs, and may have WIFI or Bluetooth® connectivity for updating content and other processing algorithms.

According to one example embodiment, an audio-visual (AV) format may be used for providing educational instruction to a student or child. The AV format may include limitless possibilities to enhance the user experience, ranging from simple and inexpensive 7-segment LED digits, to the more expensive and colorful touch-sensitive OMLED/LCD displays. For example, one example embodiment may include NFC tags since it is a non-intrusive technology. NFC tags remain hidden inside the equipment, and most of the time children will not even know the difference. A reader/display unit may be used to enhance the user experience without replacing the teaching methodology which is the essence of an old school teaching philosophy.

The usage of NFC devices to teach behavioral, linguistic, logical and computational skills, through self-aware toys, single-player or multi-player games and gadgets, may include unpowered passive NFC tags (i.e., ISO/IEC 14443 both Type A and Type B, and/or FeliCa) configured to perform read, write, peer-to-peer, and emulator mode operations. A passive NFC tag may utilize an appropriately programmed electronic processor communicating to the user through a digital display and/or voice synthesizer, and other transducers/sensors like vibration motors, light emitting diodes, an electronic compass, accelerometers, proximity sensors, etc.

FIG. 1A illustrates an example communication network and system for utilizing a NFC learning configuration according to example embodiments. Referring to FIG. 1A, a user may operate a NFC reader device 120 that includes at least a NFC tag reader which operates by RF signals to identify a tag in near proximity with the reader device 120. The communication between the NFC tag and the NFC reader may be a wireless communication signal in compliance with NFC standards. The device 120 may be a reader with a battery controlled circuit, microprocessor, display and other computing functions associated with a handheld computing device, smartphone or other common computing device. The device may be a computer, laptop, mobile, wireless or cellular phone, a PDA, a tablet, a client a server or any device that contains a processor and/or memory, whether that processor or memory performs a function related to an embodiment of the invention.

In the example of FIG. 1A, the device 120 may be a smartphone that has access to a data network via its local loop or carrier network subscription base station 130. The network may provide Internet access and access to a NFC application server and/or content server 110 operating in the Internet or the data cloud 150. A learning mat or board 140 may be used to organize a set of learning cards 142, 144 and 146 each of which has an embedded NFC tag. In this example, the tag may be a passive tag that uniquely identifies the tag for a particular software algorithm. For example, the tags may be used in a math program, an alphabet program, a college level chemistry program, etc. to identify a particular letter, number, subject or result.

In another example, the base station 130 may be a local femtocell, piconet or WLAN access device and the mobile station 120 may be set to a WLAN, WIFI or other low power wireless frequency that is used to access the application server 110 without using cellular or 3G/4G infrastructures, and thus alleviating the concern that the children using the device 120 are being exposed to mobile station frequencies, power level and related signals.

Figure 1B:
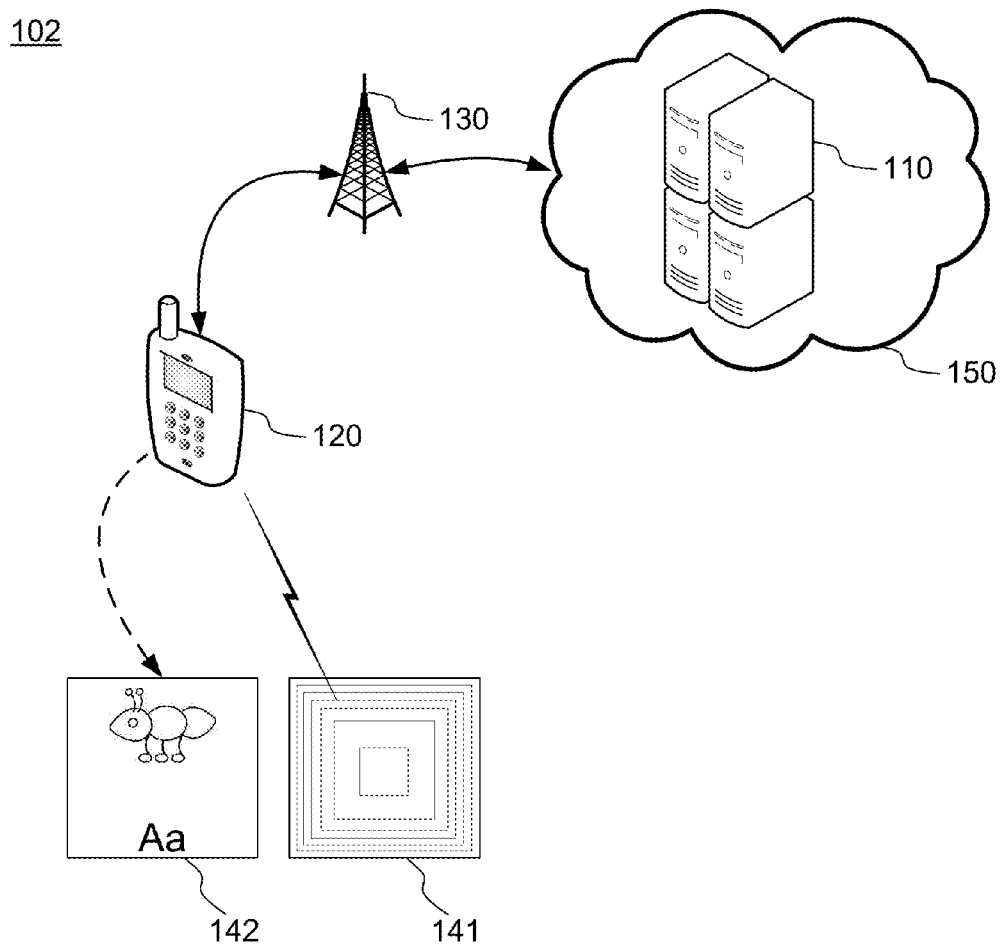
FIG. 1B illustrates an example near field communication device and corresponding learning application access configuration according to example embodiments of the present application.

In this example, the tags represent letters of the alphabet and have pictures designating the letters use. For instance, the letter "A" is used for ant 142, and the letter "B" is for barn 144, while the letter "C" is for car 146. Referring to FIG. 1B, like numerals refer to like components. The reader device 120 may be brought into contact with the NFC tag 142 which is currently presenting the letter "A" and a picture of an ant. The reverse side of the card or learning picture may include a NFC tag 141 that communicates with the reader device and transmits its unique identifier to the reader device.

Figure 1C:
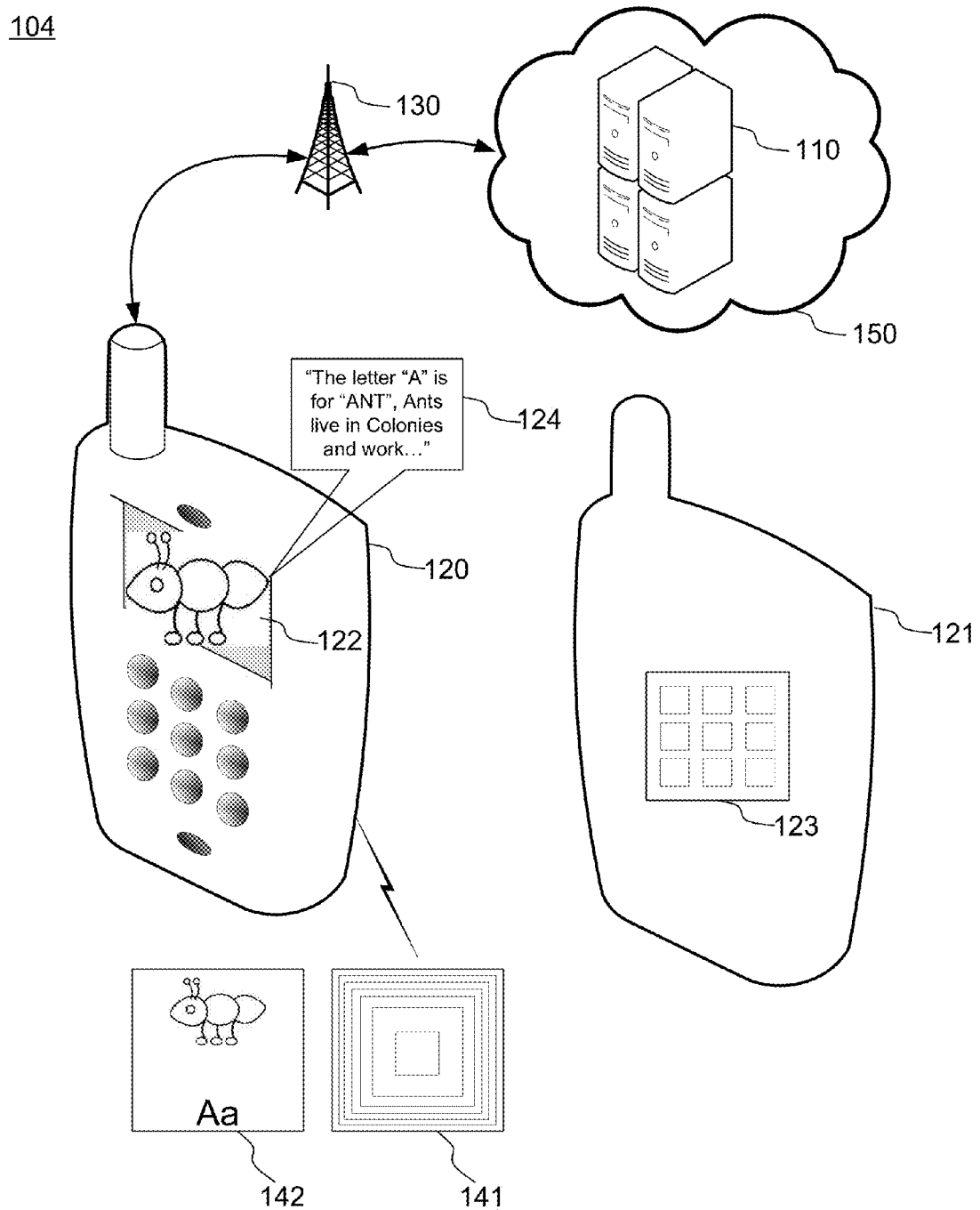
FIG. 1C illustrates an example near field communication device and corresponding learning application content retrieval configuration according to example embodiments of the present application.

FIG. 1C illustrates the result of establishing a communication session between a NFC tag and a reader device according to example embodiments. Referring to FIG. 1C, the tag 141/142 may generate a tag identifier that is linked to an alphabet program stored on the reader device 120 or on a remote server (not shown). The association between the tag identifier and the present application (e.g., learning the alphabet) may trigger a result that requires audio and/or video content to share with the user. For example, the letter "A" is associated with an ant, so the user device 120 may transmit the NFC identification information to a remote server which maps the identification information with a particular content title, such as an alphabet learning video on ants and retrieves the data and displays the content on the user's reader device 120 along with audio 124 explaining how the letter "A" is used to spell "ANT" and then tells a little story about ants for reinforcement learning. The inside of the reader device 121 may have an embedded NFC chip 123 that detects the passive NFC tag 141 and triggers the retrieval of the appropriate content from the remote server 110 based on the type of learning application currently being used by the reader device.

Figure 1D:
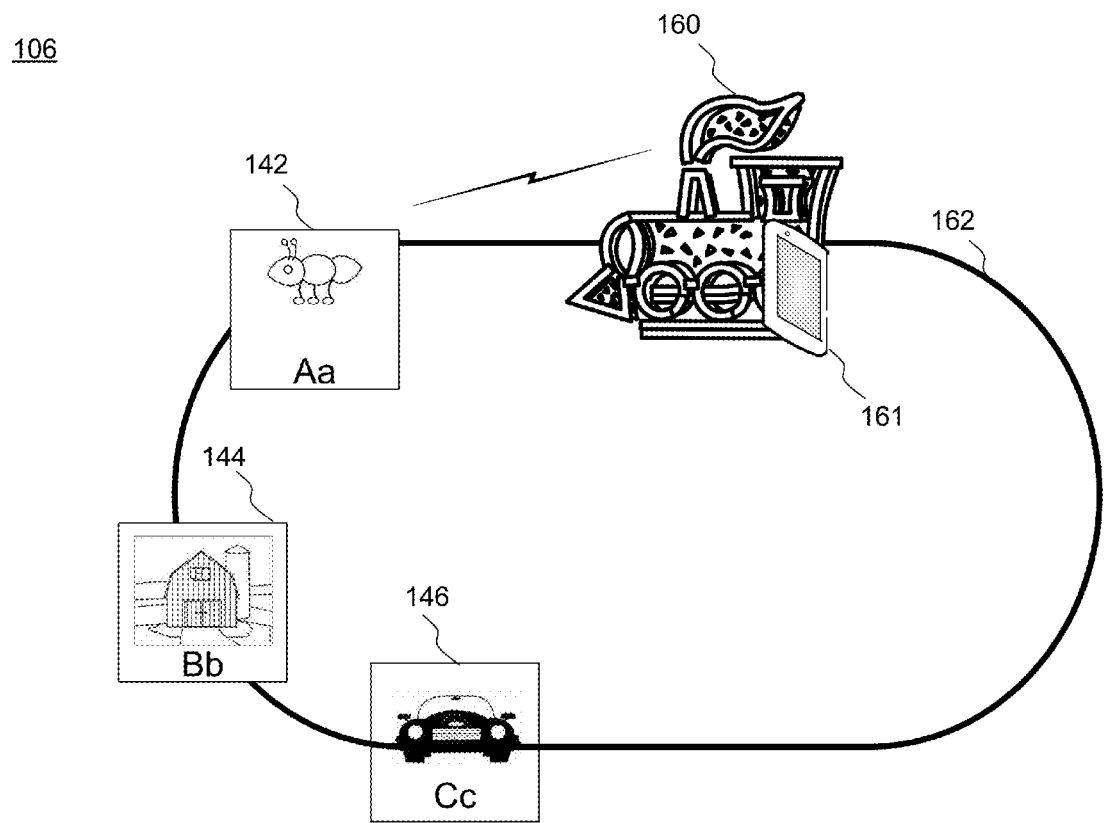
FIG. 1D illustrates an example near field communication device and corresponding toy configuration according to example embodiments of the present application.

FIG. 1D illustrates another example configuration of a passive NFC tag learning device, according to example embodiments. Referring to FIG. 1D, the train NFC toy and learning device 106 is illustrated. In this example, the train engine 160 may be a toy that a child may move about an imaginary toy train track printed on a mat that is setup with various reader stations and which has an integrated display 161. In this example, the reader stations may include any number of locations within the track or alongside the track 162 that provide a snap-in, slot and/or fitted housing that may receive a NFC tagged device to secure the learning device tag in position allowing the train to traverse the area occupied by the learning device tag and trigger the passive NFC tag inside the device, which may be a card, toy, or other object that is capable of triggering a learning media file(s).

According to one example, the train may move around the track manually via a user or automatically via a battery powered motor. The train 160 may be a stand-alone device with memory, a monitor or wireless access to another device that is capable of retrieving content from memory and displaying it on the device interface. In operation, the train may be moving around the track and each time it encounters a NFC tag, the internal NFC reader inside the train may trigger a preprogrammed memory access operation that retrieves content associated with the tag identifier in the stationary tags 142, 144 and/or 146. Similar to the examples in FIGS. 1A-1C the learning lesson may be the alphabet letters which trigger a song, words and/or video content from memory to play when the letter is identified from the close contact, adjacent and/or contiguous position of the device reader in the train with respect to the passive tags 142-146. In another example, the train or other moving object may be used with a different backdrop (e.g., Dinosaur Park, The Amazon, Egypt, etc.) so the lesson plan may change from alphabet to history, or to math, etc. The pre-stored content may be retrieved based on a combination of the tags included in the track and the software application installed on the reader. The content is retrieved responsive to a radio frequency NFC reader communication interaction between the reader and the tags.

The active NFC reader device may be any type of computing device. In one example, the device may include a processor configure to initiate an educational application user interface and a near field receiver/transmitter configured to receive or transmit a near field communication signal. The receiver may be configured to receive from a passive near field tag an identifier which is used to identify a number, letter or other lesson plan identifier and retrieve content to share with the lesson participant. The device may also include a processor that is further configured to identify an information identifier associated with the passive near field tag, compare the information identifier to an information identifier stored in memory, and match the information identifier with a predefined educational information content stored in the memory. The device may also include a display configured to display the predefined educational information content on the educational application user interface.

Figure 2A:
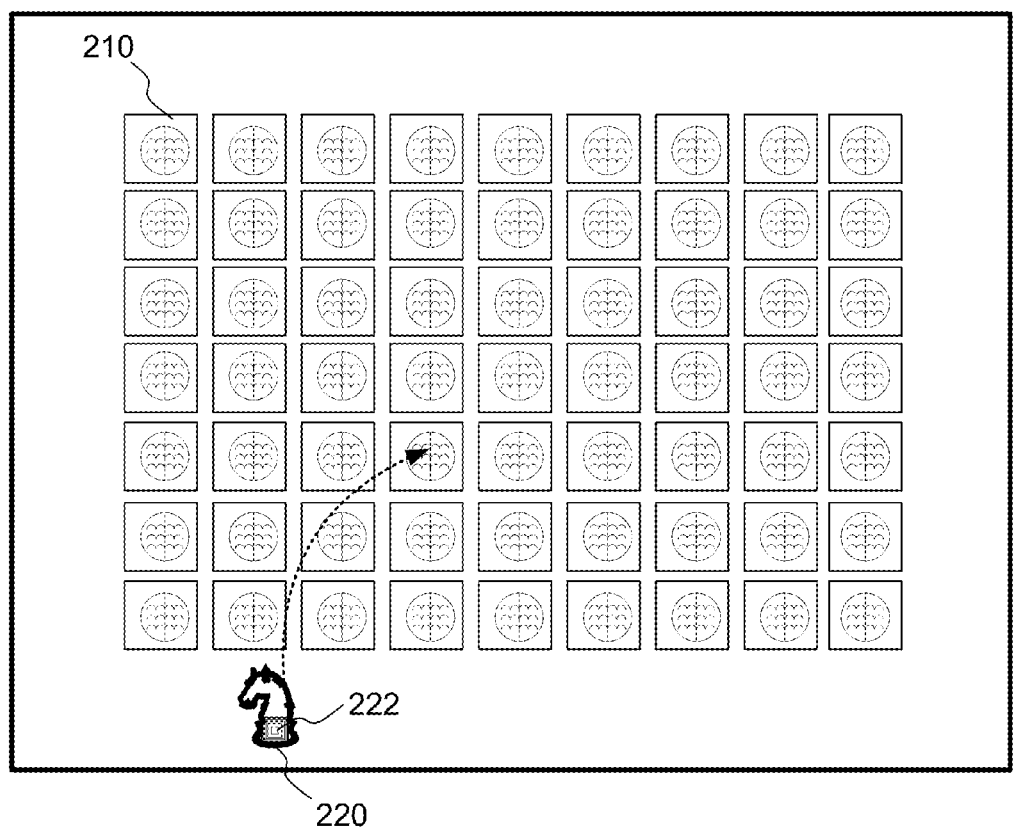
FIG. 2A illustrates an example near field chess board game device according to example embodiments of the present application.

FIG. 2A illustrates an example near field communication board or mat according to example embodiments. In FIG. 2A, the board 200 includes an array of active NFC tags or chips 210 embedded in the body of the board. In this example, the board may be used to play chess, checkers or other games based on a position of the tags included in the items placed on the board. For example, the pieces to the game in chess 220 may have passive NFC readable tags 222 included in their base so that their specific position may be known at all times by the application operating with the NFC position readers 210 in the base of the board 200.

When a piece changes position or is removed from the board, the layout of the board may be again observed by the application in communication with the pieces or readers in the board which detect the pieces position. This example may provide a way to teach a person chess, for example, the application may initiate and allow a new game to begin only when all the pieces are on the board and in the correct position. Then, only valid movements may be confirmed by the board and application and may generate prompts to inform the user whether the move was valid or not. The number of NFC readers/tags installed in the board may vary (e.g., 25, 49, 81, 100, 144, etc.). The embedded active tags 210 may be also be referred to as antennas, receiver antennas or reader antennas.

Figure 2B:
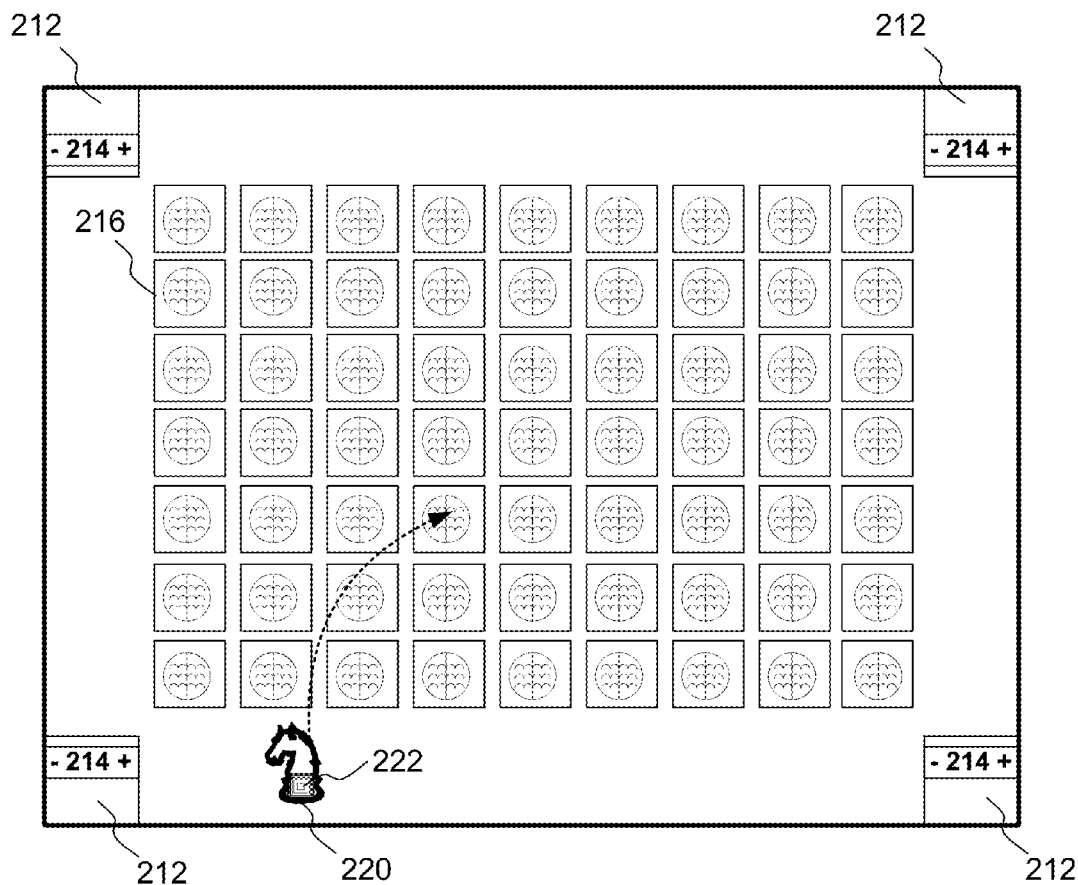
FIG. 2B illustrates an example near field chess board game device with location determination functionality according to example embodiments of the present application.
Figure 3:
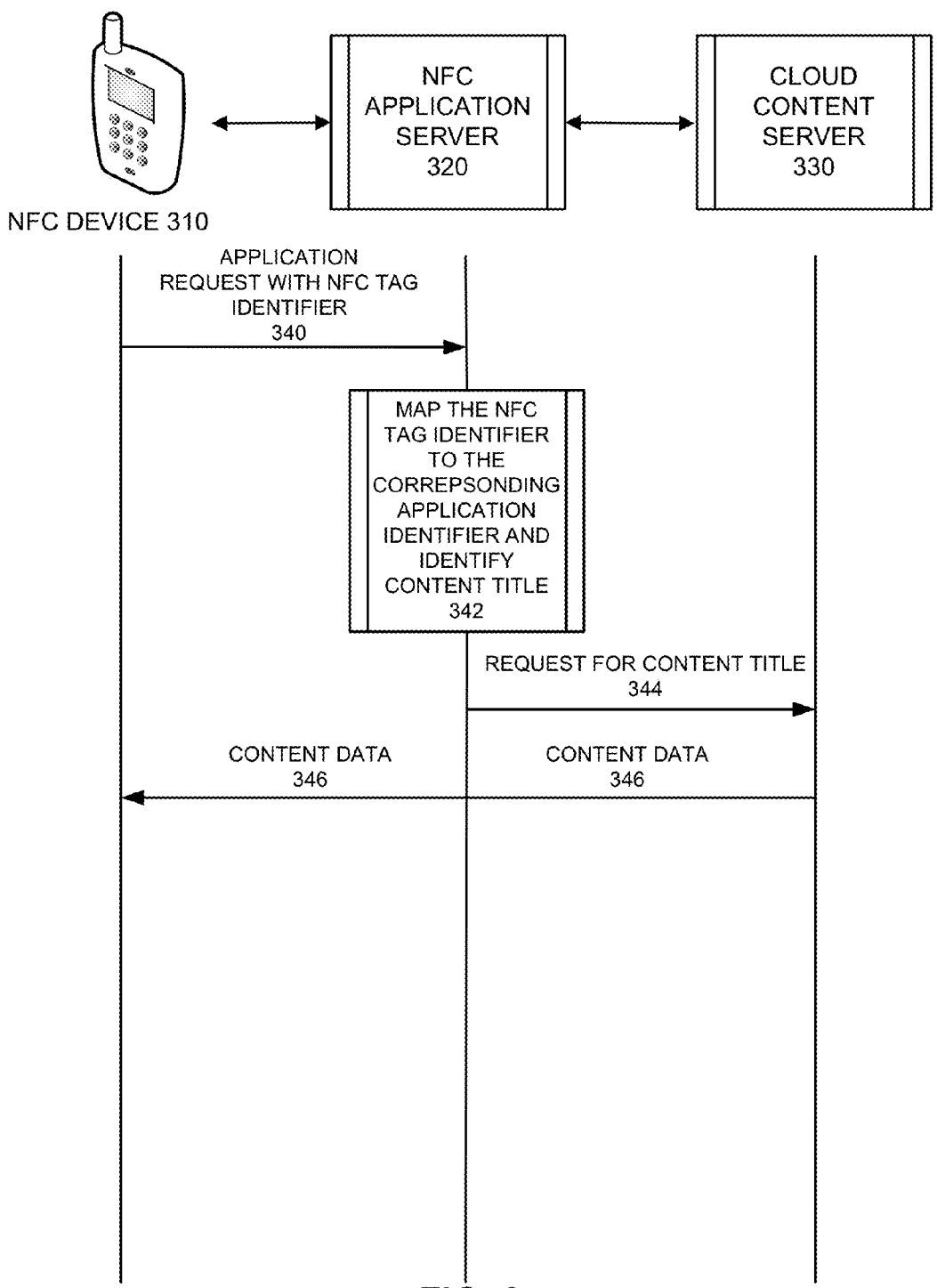
FIG. 3 illustrates an example communication signaling diagram according to example embodiments of the present application.

FIG. 2B illustrates another example embodiment of the present application. In FIG. 2B, the board includes an array of active NFC antennas in the base of the board 204. The locations on the board 216 are also place markers, and there are active NFC readers installed at the corners of the board 212. These readers 212 may be active and may include battery power 214. The positions within the board may be calibrated with the readers 212 so the game piece 220 may be identified via its NFC tag (passive or active) 222 based on a power estimation measurement and/or interpolation calculation between the plurality of readers. The number of NFC tag readers 212 may be one, two, three, four, eight, etc., and may use any known algorithm to estimate the power of the NFC tag in the game piece so the exact position may be estimated based on the relative power strength as measured by the active readers (e.g., triangulation, time difference of arrival (TDOA), etc.).

Other alternatives, to checkers or chess may include various combinations of game pieces to teach the user about combinations (e.g., multiplication tables, chemical compounds, words, etc.). For example, if it is detected that the letters "A", "R" and "T" are present on the board, the computer application associated with the NFC readable tags in the three letters may detect their presence and position. The application may then generate different results to teach the user that the three letters may be used to spell three totally different words. Another example would include chemical elements that may be included to generate compounds used to teach the user about chemistry. For example, when a user takes two hydrogen tags and places them on the board with one oxygen tag, the combination would trigger a lesson about H2O or water.

The NFC reader antenna board may be referred to as a NifCell board where all the embedded tags are active antennas actively identifying the tags that are placed on its surface to provide an educational lesson via preprogrammed software and hardware. The passive tag placed on the board will result in the underlying electronic circuitry (i.e., NifCells 210 and 218) identifying the tag and its exact position on the board with respect to the tag(s) it is nearest or via with the assistance of the corner readers 212.

Figure 4:
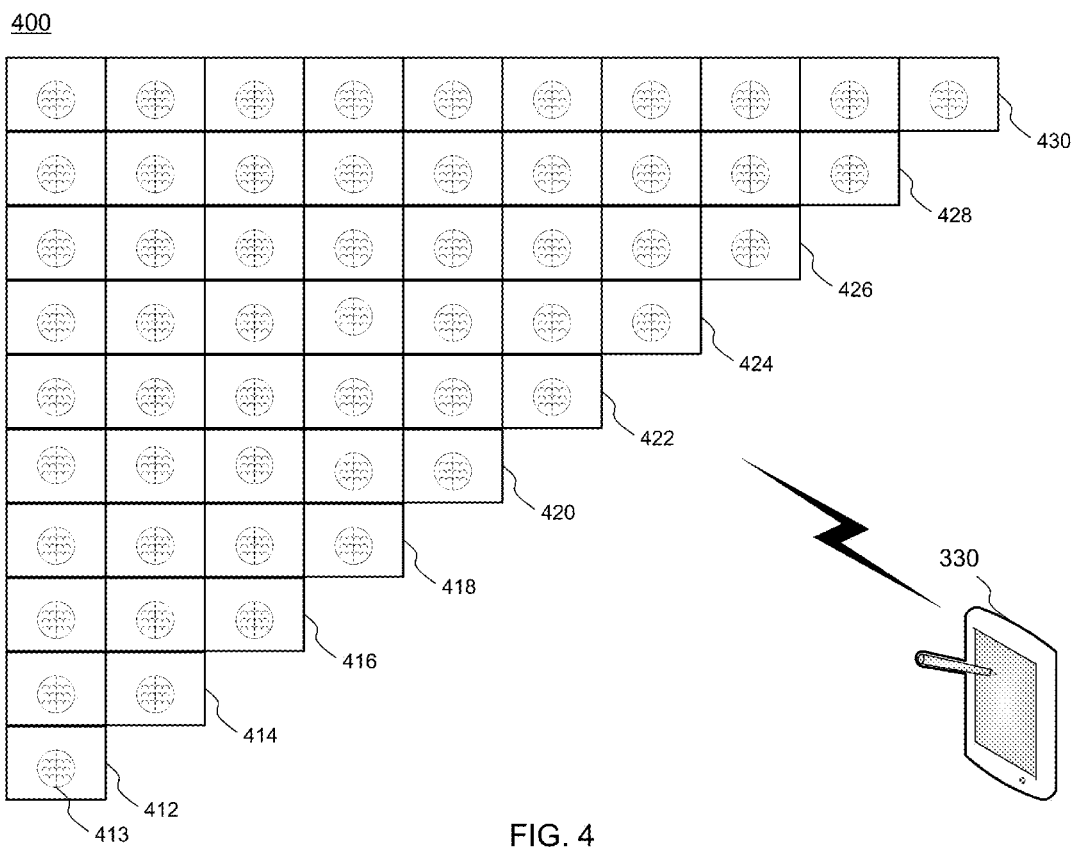
FIG. 4 illustrates an example set of learning rods that utilizes near field communication according to an example embodiment of the present application.

According to another example embodiment, the NFC readers and tags may be placed in numerical rods used to instruct young children how to count, add, subtract, multiply and divide. For instance, FIG. 4 illustrates 10 NFC reader rods 400. The first rod 412 represents the number 1 and has only one segment with one NFC tag 413. The other rods 414-430 represent the numbers 2-10, respectively. Each rod has one tag per number.

In operation, when the rods are brought along within a NFC reader range of the reader device (i.e., handheld device with monitor and battery and software application), then the reader may generate the number "1" and a song, story, image, etc. to help the children learn the significance of the number "1". All tags within the portion of the rod may have the same value or may represent that particular number of the section. For example, the rod 420 has five sections each of which represents one unit. The five NFC tags inside rod 420 may be tags that identify the numbers 1, 2, 3, 4 and 5 or alternatively all the tags may identify the number 5.

In one example, the rods may be brought together in groups of two or more to trigger an addition function, a subtraction function, a multiply function or a divide function as provided by the reader unit 330 with an embedded NFC tag reader which identifies the unique identifier of the various tags. The rods provide a visual learning aid for children and offer the additional function of having a reader guide the child through the number learning process with a software enabled application that is based on the feedback from the NFC tags.

Figure 5:
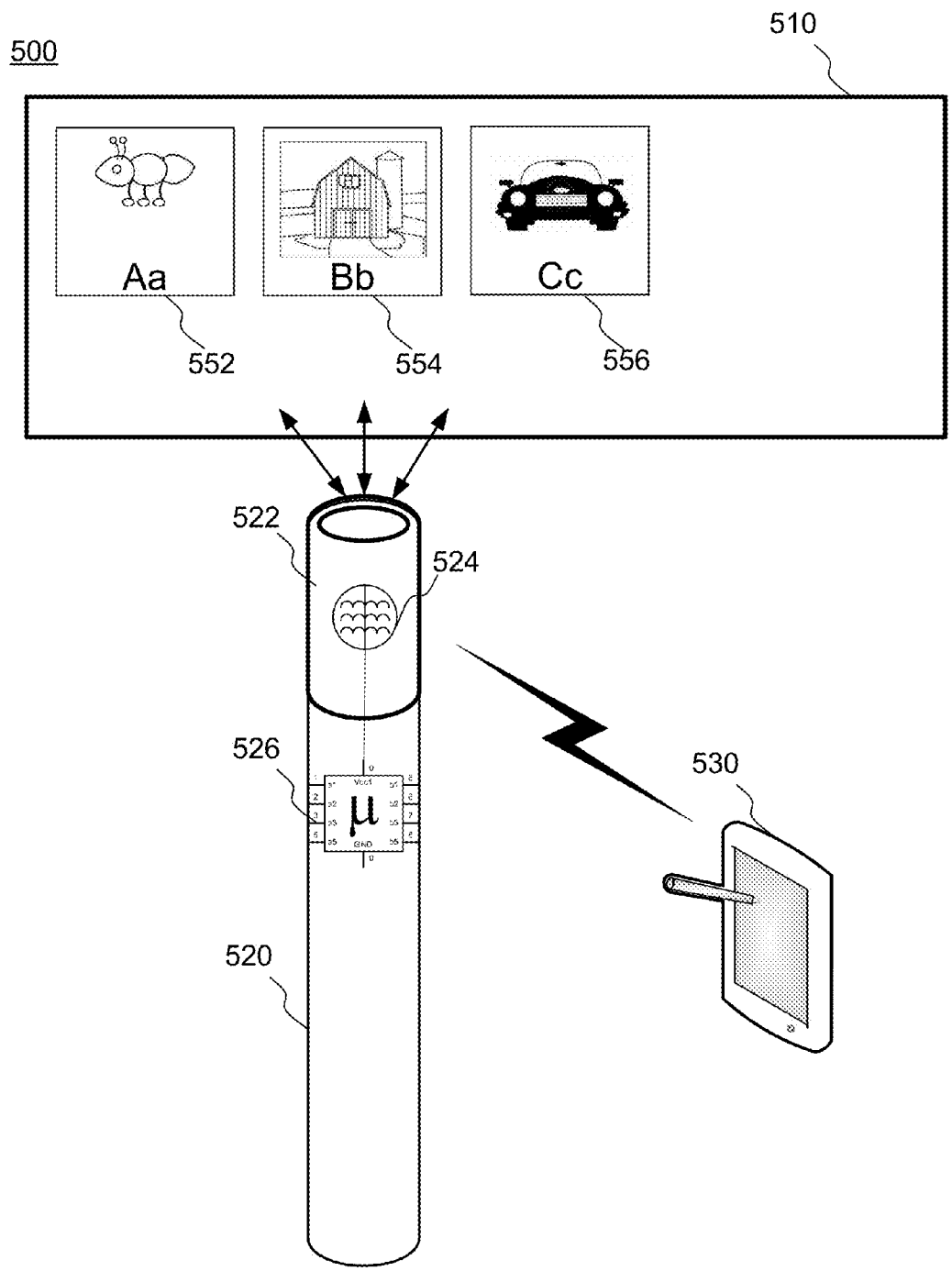
FIG. 5 illustrates an example teaching stick that utilizes near field communication according to example embodiments.

FIG. 5 illustrates another NFC tag learning configuration embodiment according to example embodiments. Referring to FIG. 5, the teaching pointer or stick configuration 500 includes the NFC reader pointing device 520 with an active powered NFC reader chip 524 included in the tip 522. The chip is in communication with a microprocessor 526 that can process the tags the reader 524 comes into contact with. In this example, the mat or chalkboard 510 may have a plurality of readable NFC tags 552, 554 and 556 similar to the example in FIGS. 1A-1C. The instructor may bring the tip of the teaching stick 520 into contact with the NFC tags to identify a particular letter of the alphabet. The information may be processed by the application in the student's reader devices 530 so they can follow along with the teacher's pointing efforts. The activation of the NFC tag may trigger content to be displayed on the user's devices. The microprocessor 526 may process the tag identifier and then invoke a lesson or information segment (i.e., "This is the letter "A" . . . ) stored in the memory of the teacher's computing device and/or the students learning devices as standalone devices with the alphabet learning programs installed.

Figure 6:
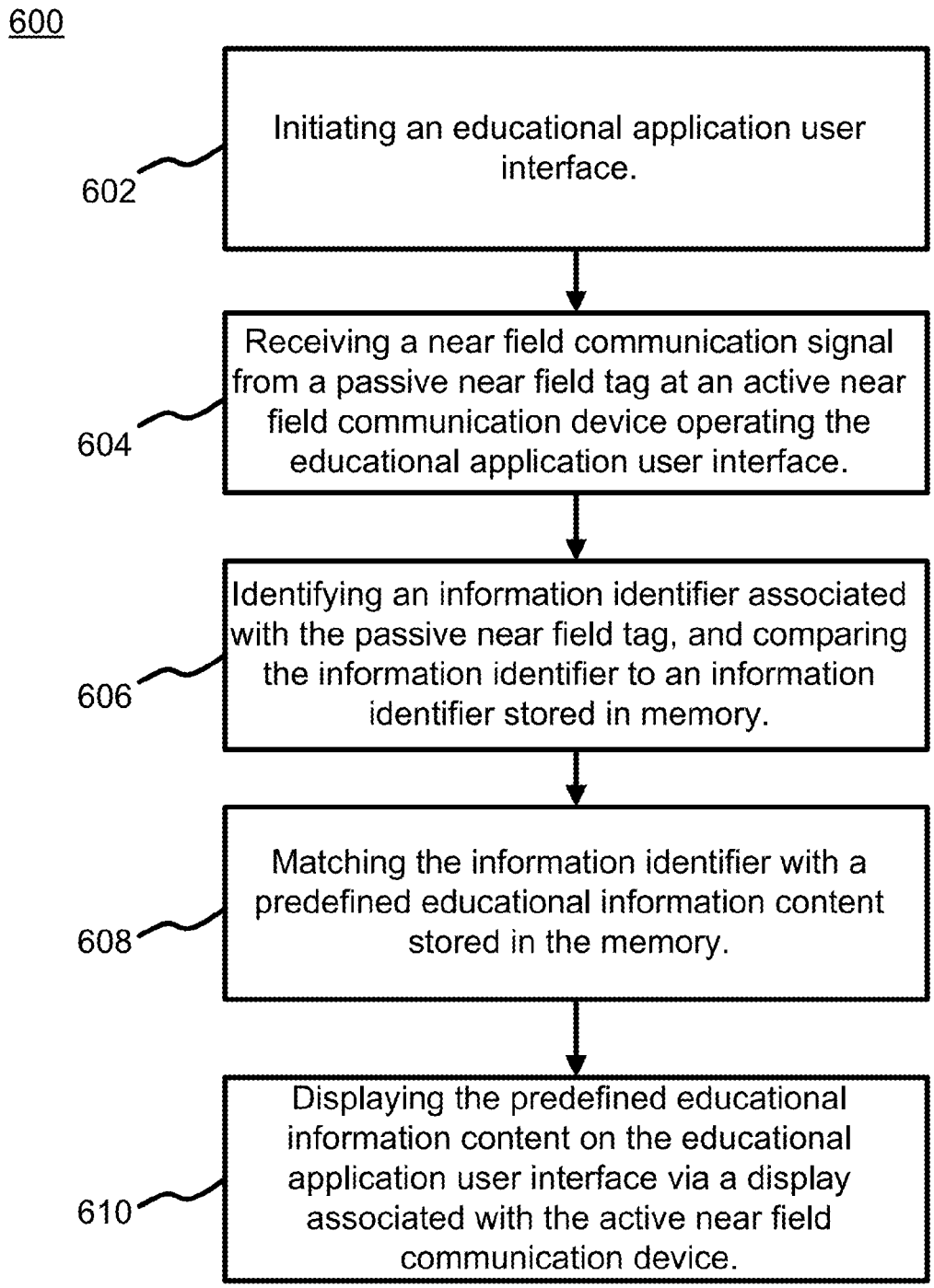
FIG. 6 illustrates an example flow diagram of an example method of operation according to example embodiments of the present application.

FIG. 6 illustrates an example method of operation according to example embodiments. Referring to FIG. 6, the method 600 includes initiating an educational application user interface at operation 602 and receiving a near field communication signal from a passive near field tag at an active near field communication device operating the educational application user interface at operation 604. The method also includes identifying an information identifier associated with the passive near field tag and comparing the information identifier to an information identifier stored in memory, at operation 606, and matching the information identifier with a predefined educational information content stored in the memory at operation 608, and displaying the predefined educational information content on the educational application user interface via a display associated with the active near field communication device at operation 610.

Figure 7:
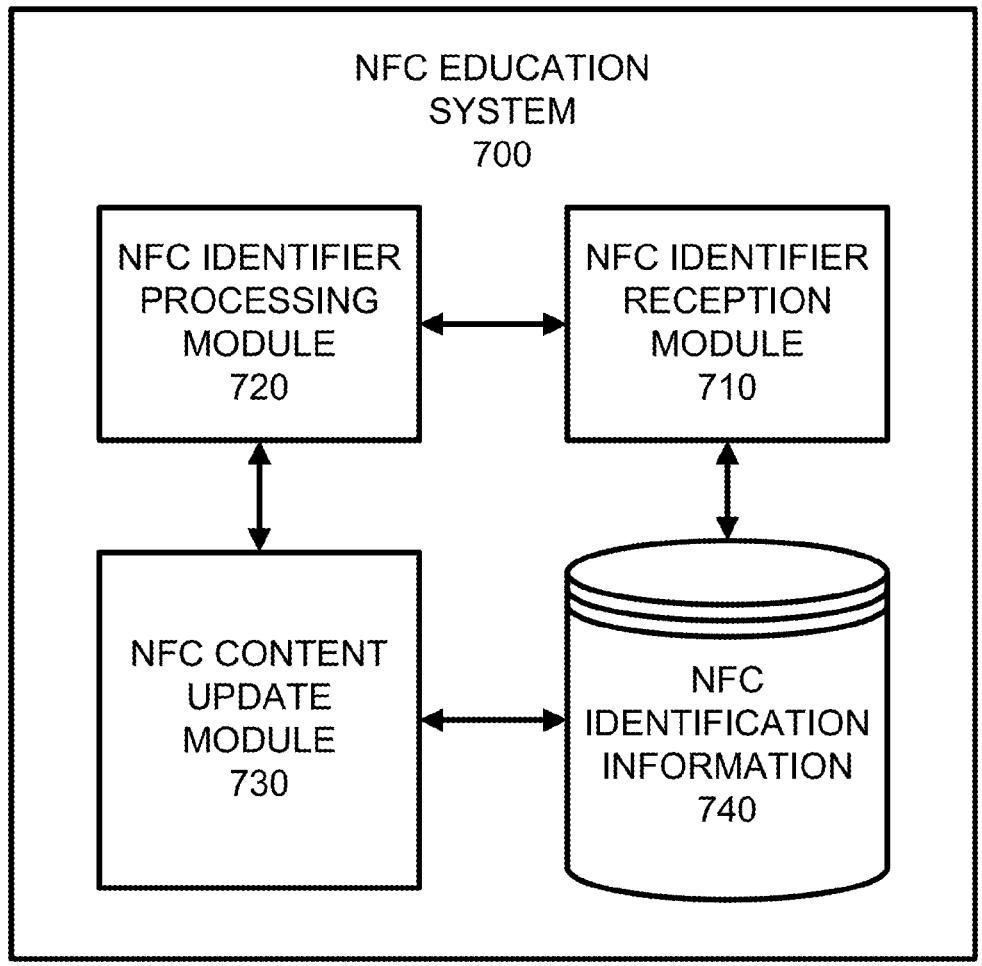
FIG. 7 illustrates a system configuration that is configured to perform one or more operations corresponding to the example embodiments.

FIG. 7 illustrates an example system that is configured to operate the example methods of operation according to example embodiments. Referring to FIG. 7, the system may be a computer or a system of computers that perform initiating an educational application user interface. The method may include receiving a near field communication signal from a passive near field tag at an active near field communication device operating the educational application user interface via the NFC identifier reception module 710, which also performs identifying an information identifier associated with the passive near field tag. The operations may also include comparing the information identifier to an information identifier stored in the NFC identification memory 740 and matching the information identifier with a predefined educational information content stored in the memory, and displaying the predefined educational information content on the educational application user interface via a display associated with the active near field communication device via the NFC content update module 730.

The memory storing the predefined educational information content may be located in the active near field communication device itself as part of the system 500 (not shown) or may be located in a remote application server accessible to the active near field communication device via at least one of a cellular 3G/4G communication standard and a WIFI data communication standard. The predefined educational information content may include one or more of an image file, an audio file, a video file and a uniform resource locator (URL) link to the information content. The active near field communication device and the display may be included in a battery operated child toy, such as an animal, a train or other toy held or operated by a user.

In addition, the passive near field tag may include a plurality of passive near field tags placed in a plurality of rods each having a different number of fixed length segments, each individual rod is a different length than all the remaining rods, and each of the plurality of rods has at least one of the plurality of passive near field tags included in its respective rod body, and the passive near field tag of each particular rod is configured to identify a total number of segments of that particular rod (see FIG. 5). Alternatively, the active near field communication device may be a hand-held instructional pointer device that includes an active near field receiver antenna in the tip of the pointer device.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 8 illustrates an example network element 800, which may represent any of the above-described network components, etc.

Figure 8:
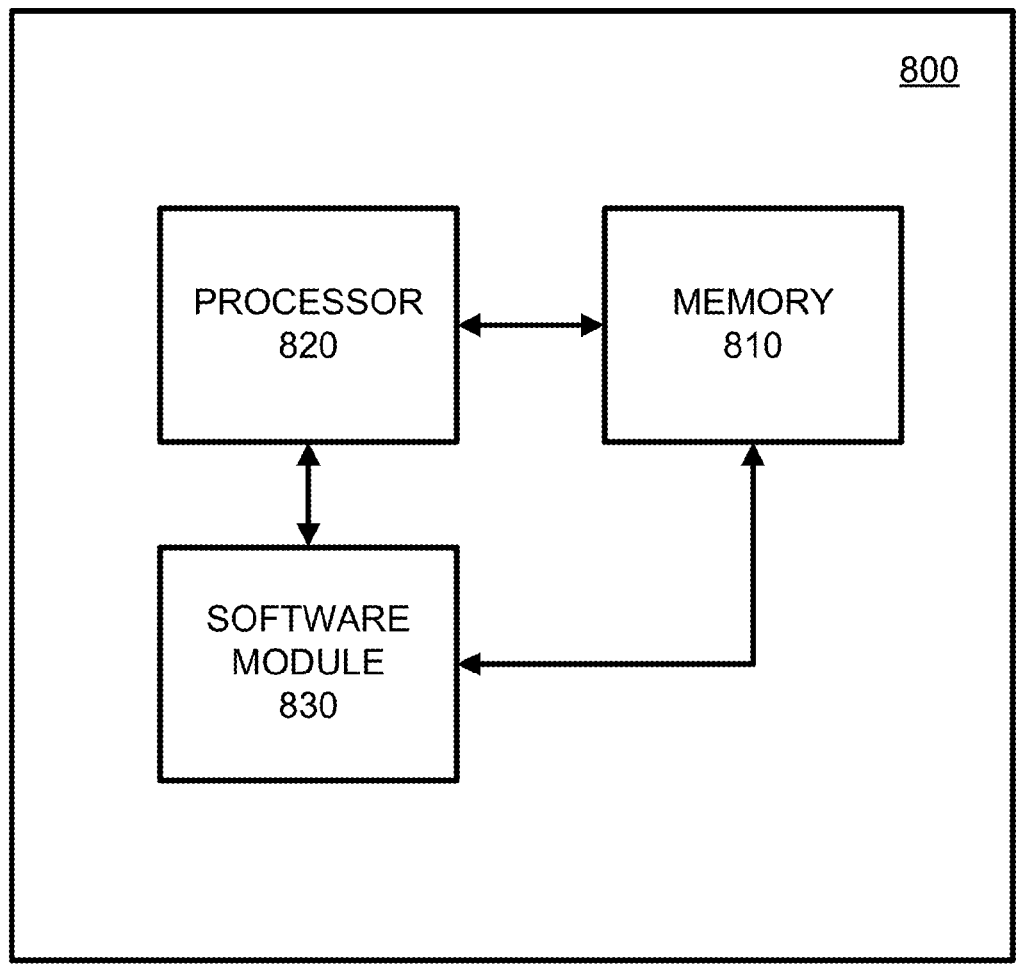
FIG. 8 illustrates an example network entity device configured to store instructions, software, and corresponding hardware for executing the same, according to example embodiments of the present application.

As illustrated in FIG. 8, a memory 810 and a processor 620 may be discrete components of the network entity 800 that are used to execute an application or set of operations. The application may be coded in software in a computer language understood by the processor 820, and stored in a computer readable medium, such as, the memory 810. The computer readable medium may be a non-transitory computer readable medium that includes tangible hardware components in addition to software stored in memory. Furthermore, a software module 830 may be another discrete entity that is part of the network entity 800, and which contains software instructions that may be executed by the processor 820. In addition to the above noted components of the network entity 800, the network entity 800 may also have a transmitter and receiver pair configured to receive and transmit communication signals (not shown).

Although an exemplary embodiment of the system, method, and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit or scope of the invention as set forth and defined by the following claims. For example, the capabilities of the system of FIG. 5 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
   receiving a near field communication signal from a near field tag located within a predetermined distance of an active near field communication device comprising a plurality of active near field antennas as an array of active near field antennas;
   identifying an information identifier associated with the near field tag;
   matching the information identifier of the near field tag with an information identifier stored in memory;
   identifying a location of the near field tag with respect to the array of active near field antennas;
   identifying content associated with the information identifier of the near field tag; and
   designating the information identifier as being located at a particular position of the array of active near field antennas.

2. The method of claim 1, wherein the memory is located in the active near field communication device, and wherein the array of active near field antennas comprises fixed-position active near field communication tags and the near field tag comprises a movable near field communication tag, and wherein the identifying the location of the movable near field tag with respect to the array of active near field antennas comprises determining a relative position of the movable near field communication tag based on the near field communication signal received by at least one of the active near field antennas.

3. The method of claim 1, wherein the memory is located in a remote application server accessible to the active near field communication device via at least one of a cellular 3G/4G communication standard and a WIFI data communication standard, and wherein the array of active near field antennas comprises fixed-position active near field communication tags and the near field tag comprises a movable active near field communication tag, and wherein the identifying the location of the movable active near field tag with respect to the array of active near field antennas comprises determining a specific position of the movable active near field communication tag with respect to the array of active near field antennas based on the near field communication signal received by at least one of the active near field antennas.

4. An apparatus comprising:
  a memory;
  a plurality of active near field antennas as an array of active near field antennas;
  a near field receiver configured to receive a near field communication signal from a near field tag located within a predetermined distance of the array of active near field antennas;
  a processor configured to
    identify an information identifier associated with the near field tag,
    match the information identifier of the near field tag with an information identifier stored in the memory,
    identify a location of the near field tag with respect to the array of active near field antennas,
    identify content associated with the information identifier of the near field tag; and
    designate the information identifier as being located at a particular position of the array of active near field antennas.

5. The apparatus of claim 4, wherein the array of active near field antennas comprises fixed-position active near field communication tags and the near field tag comprises a movable near field communication tag, and wherein the identifying the location of the movable near field tag with respect to the array of active near field antennas comprises determining a relative position of the movable near field communication tag based on the near field communication signal received by at least one of the active near field antennas.

6. The apparatus of claim 4, wherein the array of active near field antennas comprises fixed-position active near field communication tags and the near field tag comprises a movable active near field communication tag, and wherein the identifying the location of the movable active near field tag with respect to the array of active near field antennas comprises determining a specific position of the movable active near field communication tag with respect to the array of active near field antennas based on the near field communication signal received by at least one of the active near field antennas.

7. A non-transitory computer readable storage medium configured to store instructions that when executed causes a processor to perform:
  receiving a near field communication signal from a near field tag located within a predetermined distance of an active near field communication device comprising a plurality of active near field antennas as an array of active near field antennas;
  identifying an information identifier associated with the near field tag;
  matching the information identifier of the near field tag with an information identifier stored in memory;
  identifying a location of the near field tag with respect to the array of active near field antennas;
  identifying content associated with the information identifier of the near field tag; and
  designating the information identifier as being located at a particular position of the array of active near field antennas.

8. The non-transitory computer readable storage medium of claim 7, wherein the memory is located in the active near field communication device, and wherein the array of active near field antennas comprises fixed-position active near field communication tags and the near field tag comprises a movable near field communication tag, and wherein the identifying the location of the movable near field tag with respect to the array of active near field antennas comprises determining a relative position of the movable near field communication tag based on the near field communication signal received by at least one of the active near field antennas.

9. The non-transitory computer readable storage medium of claim 7, wherein the memory is located in a remote application server accessible to the active near field communication device via at least one of a cellular 3G/4G communication standard and a WIFI data communication standard, and wherein the array of active near field antennas comprises fixed-position active near field communication tags and the near field tag comprises a movable active near field communication tag, and wherein the identifying the location of the movable active near field tag with respect to the array of active near field antennas comprises determining a specific position of the movable active near field communication tag with respect to the array of active near field antennas based on the near field communication signal received by at least one of the active near field antennas.

* * * * *